(12) United States Patent
Pal et al.

(10) Patent No.: US 10,773,235 B2
(45) Date of Patent: Sep. 15, 2020

(54) MODIFIED ACTIVATED CARBON FOR ADSORPTION OF AIRBORNE FORMALDEHYDE AND METHOD FOR MAKING THE SAME

(71) Applicant: Marmon Water (Singapore) Pte. Ltd., Singapore (SG)

(72) Inventors: Nabin Kumar Pal, Bangalore (IN); Rama Kumari, Bangalore (IN)

(73) Assignee: Marmon Water (Singapore) Pte. Ltd., Singapore (SG)

( * ) Notice: Subject to any disclaimer, the term of this patent is extended or adjusted under 35 U.S.C. 154(b) by 185 days.

(21) Appl. No.: 16/027,943

(22) Filed: Jul. 5, 2018

(65) Prior Publication Data

US 2019/0351388 A1 Nov. 21, 2019

(30) Foreign Application Priority Data

May 18, 2018 (IN) .............................. 201821018724

(51) Int. Cl.
| | | |
|---|---|---|
| *B01D 53/02* | (2006.01) | |
| *B01J 20/22* | (2006.01) | |
| *B01J 20/20* | (2006.01) | |
| *B01J 20/02* | (2006.01) | |
| *B01J 20/32* | (2006.01) | |
| *B01J 20/28* | (2006.01) | |

(52) U.S. Cl.
CPC .............. *B01J 20/22* (2013.01); *B01D 53/02* (2013.01); *B01J 20/0237* (2013.01); *B01J 20/20* (2013.01); *B01J 20/28016* (2013.01); *B01J 20/3204* (2013.01); *B01J 20/3236* (2013.01); *B01J 20/3293* (2013.01); *B01D 2253/102* (2013.01); *B01D 2253/25* (2013.01); *B01D 2257/7022* (2013.01)

(58) Field of Classification Search
CPC .......... B01D 2253/102; B01D 2253/25; B01D 2257/7022; B01D 2257/708; B01D 2258/06; B01D 53/02; B01D 53/72; B01J 20/0237; B01J 20/20; B01J 20/22; B01J 20/28016; B01J 20/3204; B01J 20/3236; B01J 20/3293
See application file for complete search history.

(56) References Cited

U.S. PATENT DOCUMENTS

| | | | |
|---|---|---|---|
| 2,920,050 | A | 1/1960 | Blacet |
| 2,920,051 | A | 1/1960 | Wiig |
| 3,226,332 | A | 12/1965 | Lincoln |
| 3,355,317 | A | 11/1967 | Keith |

(Continued)

FOREIGN PATENT DOCUMENTS

| | | |
|---|---|---|
| GB | 1123822 A | 8/1968 |
| GB | 2187725 B | 4/1990 |

*Primary Examiner* — Christopher P Jones
(74) *Attorney, Agent, or Firm* — Robert Curcio; DeLio Peterson & Curcio LLC (57) ABSTRACT

A modified active carbon material for adsorption of airborne lower aldehydes. The activated carbon is impregnated with triethylenediamine (TEDA) and has a copper deposition. A filter media is formed from a method of preparing triethylenediamine (TEDA) activated carbon with deposited copper for removal of toxic formaldehyde from the environment, such as a process of making surface modified granular activated carbon media that is highly efficient in removing formaldehyde.

23 Claims, 5 Drawing Sheets (56) References Cited

U.S. PATENT DOCUMENTS

| | | |
|---|---|---|
| 3,739,550 A | 6/1973 | Martin |
| 4,040,802 A | 8/1977 | Deitz et al. |
| 4,111,833 A | 9/1978 | Evans |
| 4,242,226 A | 12/1980 | Siren |
| 4,482,641 A | 11/1984 | Wennerberg |
| 4,517,111 A | 5/1985 | Dorman et al. |
| 4,531,953 A | 7/1985 | Groose et al. |
| 4,677,096 A | 6/1987 | van der Smissen |
| 4,801,311 A | 1/1989 | Tolles |
| 4,831,003 A | 5/1989 | Lang |
| 5,063,196 A | 11/1991 | Doughty |
| 5,830,414 A | 11/1998 | Ishii et al. |
| 5,948,398 A | 9/1999 | Hanamoto et al. |
| 5,997,829 A | 12/1999 | Sekine et al. |
| 2015/0086459 A1* | 3/2015 | Poulston ................ B01J 35/006 423/247 |
| 2016/0236169 A1* | 8/2016 | Doughty .................. B01J 20/22 |
| 2016/0263549 A1* | 9/2016 | Gaur ........................ B01J 20/20 |
| 2017/0113203 A1 | 4/2017 | Rezuke et al. |

\* cited by examiner

MODIFIED ACTIVATED CARBON FOR ADSORPTION OF AIRBORNE FORMALDEHYDE AND METHOD FOR MAKING THE SAME

BACKGROUND OF THE INVENTION

1. Field of the Invention

The present invention discloses a method of preparing activated carbon-based filtration media for removal of toxic formaldehyde from the environment. More particularly, the present invention relates to a process of making surface modified granular activated carbon media that is highly efficient in removing lower aldehydes such as formaldehyde in gaseous form from the environment. The media as developed has a very high service life and is particularly useful as the active component of industrial respirators, military masks, indoor air purifiers, ventilation filters, exhaust filters, collective gas filters, and the like to effectively remove lower aldehydes from the atmosphere at an ambient condition.

2. Description of Related Art

Lower aldehydes, typically formaldehyde, acetaldehyde, etc., are harmful gases having a characteristic irritating odor and have long been known to cause discomfort and to be a potential health hazard over prolonged contact. For formaldehyde, an acceptable air concentration level of 0.5 ppm has been considered a generally acceptable level. Exposure to formaldehyde at even low levels causes irritation of the eyes, nose, and throat. Major toxic effects caused by acute formaldehyde exposure via inhalation are eye, nose, and throat irritation, coughing, chest-pain, wheezing, diarrhea, nausea, vomiting, headaches, dizziness, lethargy, irritability, bronchitis, disturbed sleep, olfactory fatigue, and skin irritation. Sources of formaldehyde, especially in the home environment, are numerous. According to many studies, exposure to airborne formaldehyde concentration over 100 ppm could result in coma or even death.

Airborne formaldehyde can be traced to manufacturing processes, formaldehyde producing plants, particle board, plywood, insulation foam, carpeting, building materials, furniture, tobacco, and cigarette smoke. In indoor air, emission of formaldehyde mainly occurs from home furnishing and building materials, and the level of formaldehyde is normally found to be in the range of 0.1 to 4 ppm although higher levels of formaldehyde have been detected in many occasions, mostly inside newly built office rooms, factories, etc.

In recent years, the hazard and odor features of these lower aldehydes have become a serious issue and a causing factor towards air pollution. Therefore, means by which to remove or lower the levels of airborne formaldehyde is of prime importance. The adsorbents so far used to remove lower aldehydes include, among others, active carbon, activated clay, silica gel, activated alumina, and clay minerals and, among them, active carbon has been employed extensively. Active carbon has been used in various forms such as molded, pellets, powder, granules, etc. These adsorbents, typically granular alumina and active carbon in pure form, have few drawbacks such as they are poor in adsorbing lower aldehydes and have a short service life at an ambient room condition. As a measure for achieving improvements in these respects, impregnated or surface modified activated carbon has been used in many prior arts. Over the years a number of modified compositions have been tried which tend to improve the adsorption and aging characteristic of the filter media. Activated carbon or charcoal which has been impregnated with metals and metal compounds has been reported in many prior arts.

U.S. Pat. Nos. 2,920,050 and 2,920,051, both to Blacet, et al., describe the preparation of whetlerite type filters which include copper, chromium, silver and molybdenum impregnant. U.S. Pat. No. 3,739,550 to Martin, et al., discloses activated carbon impregnated with a mixed catalyst which includes a vanadium compound and at least one compound of potassium, lithium, or barium. British patent No. 2,187,725 discloses activated charcoal impregnated with transition metal salts preferably consisting of cobalt, nickel or zinc acetate. U.S. Pat. No. 3,355,317 to Keith, et al., discloses the use of the oxides of cobalt, copper, zinc, iron and molybdenum on activated carbon to remove hydrogen cyanide from tobacco smoke. U.S. Pat. No. 4,677,096 to van der Smissen discloses an activated carbon, silica gel, molecular sieves, or activated alumina, which contains zinc oxide with other impregnates.

Other examples of activated carbons and metal oxides include: U.S. Pat. No. 4,482,641 to Wennerberg; U.S. Pat. No. 4,831,003 to Lang, et al.; U.S. Pat. No. 5,948,398 to Hana moto, et al., and U.S. Pat. No. 5,997,829 to Sekine, et al.

U.S. Pat. No. 5,830,414 discloses an air cleaning filter comprising activated carbon fibers in the form of a web supporting at least one kind of chemical reagent selected from the group consisting of: (a) an alkali agent selected from a hydroxide or carbonate of an alkali metal; (b) an acidifying agent selected from acid aluminum phosphate or phosphoric acid; and (c) an oxidizing agent composed of active manganese dioxide resulting from an alkali permanganate and an alkali iodate.

U.S. Pat. No. 4,517,111 provides a composition comprising a permanganate salt adsorbed onto a solid alkaline support useful for irreversible removing of formaldehyde from air. The composition can be employed in molded, pellet, particle, or power form as, for example, in a respirator filter cartridge. U.S. Pat. No. 4,242,226 discloses an activated carbon matrix filter material having a metal uniformly dispersed therein. The preparation of granular alumina impregnated with solid oxidizing agent such as potassium permanganate is described in U.S. Pat. No. 3,226,332. These metal ions impregnated alumina or activated carbon are somewhat effective in removing formaldehyde vapors from ambient air, however they have been found to have a short service life, and potential toxicity associated with many transition metal ions requires special consideration.

These stated deficiencies lead to the elimination of a large number of prior art potential impregnates from use in respirators and collective filter application. In addition to a number of other inorganic materials which have been impregnated on activated carbon, various organic impregnants, particularly amino compounds such as aliphatic/aromatic amines, hydrazine, urea, pyridine, pyridine carboxylic acids, imidazole have been found effective in removing of lower aldehydes. U.S. Pat. No. 4,111,833 to Evans discloses activated charcoal impregnated with triethylenediamine and a mixture of iodine and potassium to remove iodine from a nuclear reactor effluent stream. U.S. Pat. No. 4,040,802 to Deitz, et al., discloses activated charcoal impregnated with a tertiary amine, such as triethylenediamine and iodine or bromine to remove methyl iodine from a nuclear reactor effluent stream. British Pat. No. 1,123,822 discloses activated charcoal impregnated with piperazine or triethylenediamine to remove iodine from nuclear waste effluent. U.S. Pat. No. 3,355,317 to Keith et al discloses the use of the oxides of cobalt, copper, zinc, iron and molybdenum on activated carbon to remove hydrogen cyanide from tobacco smoke. U.S. Pat. No. 4,801,311 to Tolles discloses a whetlerite type activated carbon filter material impregnated with copper, silver, and molybdenum and/or vanadium salts together with triethylenediamine. U.S. Pat. No. 4,531,953 to Groose discloses an activated carbon impregnated with copper, silver and/or chromium mixtures and triethylenediamine. US Pub. No US2017/0113203 A1 to Rezuke, et al., discloses use of fibrous web substrate with activated carbon impregnated with TRIS [tris-(hydroxymethyl) aminomethane] as a means for removing organic and inorganic airborne impurities.

SUMMARY OF THE INVENTION

It is an object of the present invention to provide a toxic material free, activated carbon-based media for an efficient removal of formaldehyde through the impregnation of the activated carbon with a unique combination of TEDA and copper. The active carbon used in the present invention is porous and either pellet or granular type. The impregnated carbons of the present invention have the capacity to remove large amount of formaldehyde over a longer period than prior art carbons. Moreover, the formulation of the impregnants, e.g., TEDA and copper, can be varied to achieve the desired enhanced removal capacity of formaldehyde vapors and extended shelf life aimed for a particular application.

Furthermore, it is an object of the present invention to provide an improved, simple, and convenient method of preparing TEDA and copper impregnated active carbon media for irreversible removal of formaldehyde.

It is a further object of the invention to provide an activated carbon substrate for use in both military and industrial respirator and collective filter applications.

Lastly, it is an object of the present invention to find out the optimized loading concentration of the impregnants (TEDA and Cu) to achieve the best adsorption performance for formaldehyde.

The above and other objects, which will be apparent to those skilled in the art, are achieved in the present invention which is directed to a method of preparing activated carbon-based filtration media for adsorption of airborne lower aldehydes, comprising: introducing activated carbon having a predetermined mesh size; impregnating the activated carbon with a tertiary nucleophilic amine forming amine-impregnated activated carbon; and depositing copper on the amine-impregnated activated carbon, forming an amine-Cu composition.

The tertiary nucleophilic amine may comprise a water soluble tertiary amine, and particularly triethylenediamine (TEDA).

The step of forming amine-impregnated activated carbon comprises forming TEDA-impregnated activated carbon.

The step of forming the amine-Cu composition comprises forming a TEDA-Cu composition.

Activated carbon may include coconut-based carbon, coal-based carbon, or wood-based, or any combination thereof. The activated carbon may be in granular form.

The predetermined mesh sizes can be on the order of 4×8, 6×12, 8×16, 12×20, 12×30, 18×40, or 20×50.

The step of impregnating the activated carbon with the tertiary nucleophilic amine may include: applying an aqueous solution of the tertiary nucleophilic amine onto the activated carbon; and drying the amine-impregnated activated carbon.

The step of drying the amine-impregnated activated carbon may include: performing a first drying step at approximately 80° C.-100° C. for about eight hours; and performing a second drying step at approximately 160° C. for about four hours; until moisture content of the amine-impregnated activated carbon is approximately less than 2 percent.

The step of depositing copper on the amine-impregnated activated carbon includes depositing copper by an incipient wetness impregnation method and drying the amine-Cu composition at approximately 100° C. for about twelve hours.

The copper may be added as copper salt of nitrate or chloride or acetate. Particularly, the copper comprises copper sulfate pentahydrate having a purity of about 99% or greater.

In a second aspect, the present invention is directed to method of preparing activated carbon-based filtration media for adsorption of airborne lower aldehydes, comprising: introducing activated carbon having a predetermined mesh size; impregnating the activated carbon with triethylenediamine (TEDA), forming TEDA-impregnated activated carbon; and depositing copper on the TEDA-impregnated activated carbon, forming a TEDA-Cu composition.

In a third aspect, the present invention is directed to a method of forming a triethylenediamine/copper (TEDA-Cu) composition for a filtration media for removal of formaldehyde, the method comprising: introducing activated coconut-based carbon, activated coal-based carbon, or activated wood-based carbon, having a predetermined mesh size of about 4×8, 6×12, 8×16, 12×20, 12×30, 18×40, and/or 20×50; impregnating the activated carbon with triethylenediamine (TEDA) by applying an aqueous solution of TEDA onto the activated carbon, and drying the TEDA impregnated activated carbon in a two step process including: performing a first drying step at approximately 80° C.-100° C. for about eight hours; and performing a second drying step at approximately 160° C. for about four hours; until moisture content of the TEDA impregnated activated carbon is approximately less than 2 percent, thereby forming TEDA-impregnated activated carbon; and depositing copper on the TEDA-impregnated activated carbon, forming the TEDA-Cu composition.

The step of depositing copper on the TEDA-impregnated activated carbon may include depositing copper by an incipient wetness impregnation method and drying the TEDA-Cu composition at approximately 100° C. for about twelve hours.

In a fourth aspect, the present invention is directed to an air filter media for removal of formaldehyde comprising an activated carbon impregnated with triethylenediamine (TEDA), and deposited with copper. The activated carbon includes coconut-based carbon, coal-based carbon, or wood-based, or any combination thereof. The activated carbon has a predetermined mesh size of 4×8, 6×12, 8×16, 12×20, 12×30, 18×40 and/or 20×50. The air filter media comprises TEDA of 0.5 to 10 Wt. % and copper of 0.1 to 10 Wt. %.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-5 of the drawings in which like numerals refer to like features of the invention.

There are a number of prior art works which relate to impregnated activated carbon-based adsorbents for removal of lower aldehydes such as formaldehyde. Many of them used impregnates such as chromium, cobalt, or nickel, which are potential carcinogens and thus can lead to undesirable side effects. Moreover, these adsorbents were found to have a very small shelf-life. In addition to a number of inorganic materials which have been impregnated on activated carbon, various organic impregnants have also been found useful in many cases. Most of the organic impregnates have a tendency to volatilize at elevated temperature, which reduces their overall adsorption efficiency and service life substantially. Moreover, the conditions mentioned in many prior arts required the formation of the adsorbent materials including carbon type, and processing methods, which are critical and may be hard to achieve.

To overcome these disadvantages, the present invention introduces an adsorbent material having tailor-made surface properties that enable adsorption of lower aldehydes, such as formaldehyde, efficiently over a longer period of time. In this invention, a water soluble tertiary nucleophilic amine, and preferably TEDA, is used for impregnation. TEDA is an organic amine has minimal toxicity, quite stable at room temperature and adsorb strongly onto carbon. Copper has been used as an additional impregnant, and added onto the amine-impregnated (TEDA-impregnated) carbon surface. The addition of copper salt onto the TEDA impregnated carbon surface results in the formation of TEDA-Cu complex adduct. The formation of the TEDA-Cu adduct increases the thermal stability of TEDA, thus increasing its bonding strength with the carbon substance which results in longer service life. Moreover, synergistic mechanism between TEDA and Cu proved to enhance the overall adsorption capacity of the adsorbent material.

The filter media of the present direction may be directed to an air filtration application. The media comprises TEDA impregnated porous carbon substrate onto which copper has been deposited. The developed media is capable of removing or reducing the concentration of lower aldehydes efficiently over a longer period of time at room temperature. Additionally, the developed media is comparatively inexpensive with respect to current state-of-the-art media. TEDA or triethylenediamine (IUPAC name: 1,4-Diazabicyclo [2.2.2] octane) used in the present invention is a non-volatile cyclic nucleophilic amine having high water solubility and molecular weight of 112.18 g/mol. Because of low molecular weight and the presence of unhindered amine group, TEDA can act as a strong Lewis base and has high affinity towards carbon substrate. A high affinity towards carbon substrate is required because a weakly bound or volatile impregnant would readily desorb from the support substance while air passes through the media. This would lead to loss in the removal capacity of the media. High water solubility of the amine compound is also required as most of the organic solvents are quite expensive. Bonding of TEDA with the carbon substrate is mainly physical in nature, however in some cases formation of H-bonding is possible between the amine moieties of TEDA and the acidic oxygen groups present on the carbon surface.

Initially, copper was added in order to increase the thermal stability of TEDA to increase the service life of the adsorbent media. The copper can be added as a copper salt of nitrate or chloride or sulfate or acetate. An unexpected result of the combination of Cu and TEDA was the enhancement of the overall adsorption capacity of the media. Synergistic mechanisms between Cu and TEDA could play an important role in enhancing the adsorption performance of the media. In this invention, the loading concentration of TEDA and copper is on the order of 0.5-10 Wt. % TEDA and 0.1-10 Wt. % Cu. A loading of 3 Wt. % TEDA and 3 Wt. % Cu was optimized and proved to be a preferred amount to achieve the best lower aldehydes (including formaldehyde) adsorption.

Strong interaction between basic TEDA and an acidic carbon surface makes TEDA non-volatile and an excellent remover of lower aldehyde, particularly formaldehyde. Deposition of transition metals on porous carbon surface has been long known and described in many prior art literatures for reducing formaldehyde emission. However, most of these works have significant limitations from chemical, environmental, production, and/or economical points of view.

In the present invention copper has been used as an additional impregnant which is deposited onto the support carbon surface in the form of oxides. The addition of copper salt onto the TEDA impregnated carbon surface results in the formation of TEDA-Cu complex adduct. This TEDA-Cu adduct incorporated onto the porous carbon substrate has been found to be excellent in removing formaldehyde. The capacity has been shown to be about 3-4 times better that of commercially available non-impregnated activated carbons. It is understood that the formation of TEDA-Cu adduct increases the thermal stability of TEDA thus increasing its bonding strength with the carbon substance, which results in longer lasting filter media capable of removing formaldehyde for an extended period of time than an untreated filter media of the same type. The present invention is useful in both respirator and collective filter applications.

The TEDA-Cu composition can be varied to adjust the performance characteristics to achieve the desired enhanced removal capacity for a particular application.

Media Preparation

The filtration media developed in the present invention may be prepared in two simple steps. The activated carbon may include a coconut-based/coal-based/wood-based carbon in granular form. Specific mesh sizes that are found to be suitable in the practice of the present invention include 4×8, 6×12, 8×16, 12×20, 12×30, 18×40, and/or 20×50 mesh sized activated carbons. It is preferable that the carbon-based support is highly porous having high surface area.

A first step includes impregnation of the activated carbon with TEDA. Surface impregnation is a chemical modification which is defined as the fine distribution of chemicals and metal particles in the pores of the activated carbon. Impregnation with TEDA can be carried out by applying an aqueous solution of the amine, by spraying or wetting, onto the activated carbon, followed by drying in a tunnel drier/fluidized bed reactor at a low temperature preferably at 80° C.-100° C. for about 8 to 12 hours, and followed by drying at 160° C. for about 4 hours until the final moisture content become less than 2%. Concentration of TEDA used in the impregnation process is in the range of 1 to 4 Wt. %.

In the 2nd step, copper (1-4 Wt. %) is deposited on to the dried TEDA-impregnated activated carbon by incipient wetness impregnation method. Copper Sulfate Pentahydrate (purity >99%) from Merc was used as the source of copper in this case.

Both TEDA-impregnated GAC and TEDA-impregnated GAC with Cu (the incented product) were tested for the removal formaldehyde The formulation may vary depending upon the particular application and desired removal capacity for formaldehyde required.

Figure 1:
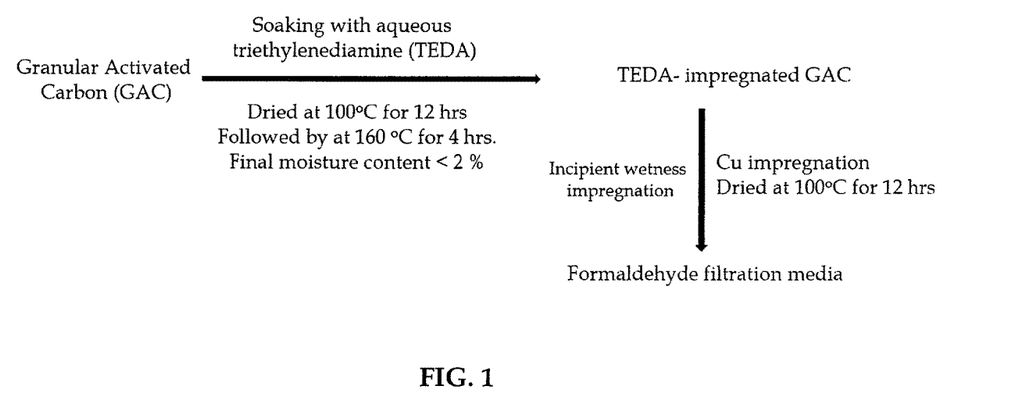
FIG. 1 depicts a flow diagram of the media preparation of the filter media of the present invention.

FIG. 1 depicts a flow diagram of the media preparation. As shown, granular activated carbon (GAC) is soaked with aqueous triethylenediamine (TEDA) and dried in a two-stage drying process until the moisture content is about less than 2%. The TEDA-impregnated GAC is then deposited with Copper (Cu impregnation) and dried, forming the resultant formaldehyde filtration media.

Dynamic Adsorption of Formaldehyde in a Packed Bed Column

Figure 2:
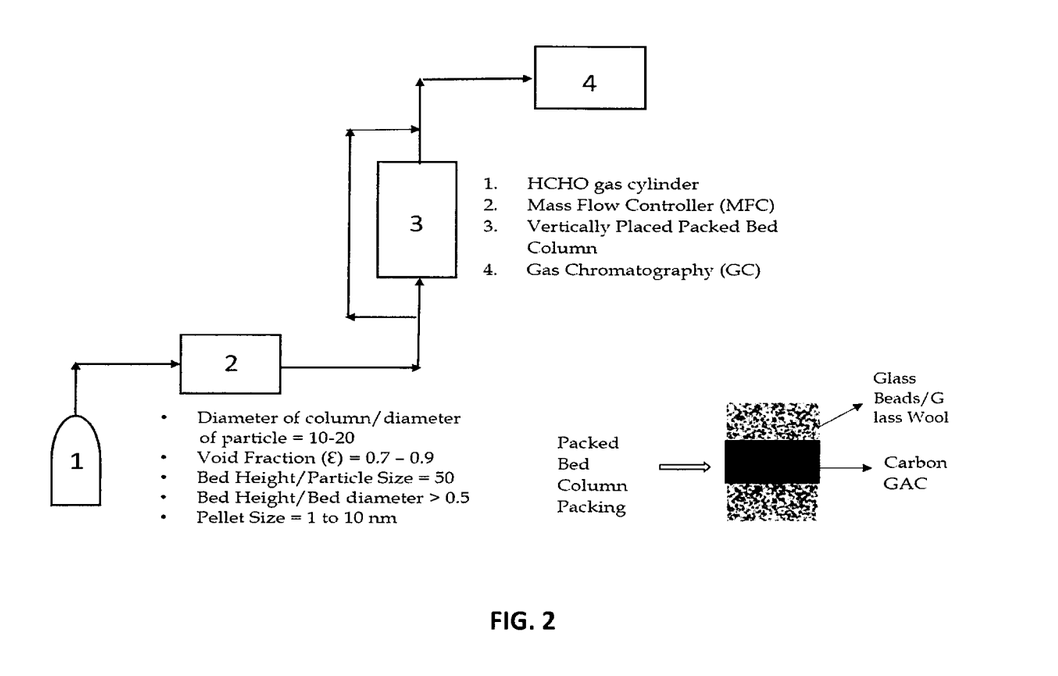
FIG. 2 shows a schematic diagram of a representative experimental setup for studying the breakthrough time and removal capacity of various contaminants in a packed bed column.

The performance of the formed media of the present invention was tested in a suitable experimental setup. FIG. 2 shows a schematic diagram of a representative experimental setup for studying the breakthrough time and removal capacity of various contaminants in a packed bed column. The removal efficiency of the invented media is tested by incorporating 5 g of the media inside a packed-bed stainless-steel column with length approximately 17.8 cm and inner diameter 3.2 cm at 25° C. temperature and 1 atmospheric pressure. The column is placed vertically equipped with a mass flow controller (MFC). Both bottom and top section of the column were supported by glass beads to avoid channeling of fluids leading to poor mass transfer. The column to particle diameter is maintained in between 10 to 20 to minimize channeling. The bed voidage is usually 70 to 90%. The ratio of bed height to diameter is maintained greater than 0.5. A challenge concentration of 1000 ppmv formaldehyde was taken for the bench test. This challenge concentration is 334 times the current established OSHA permissible exposure limit, 500 times the ACGIH recommended exposure limit and 1000 times the NIOSH recommended exposure limit for workplaces. An air containing 1000 ppm formaldehyde by volume was passed through the packed bed column filter at a constant flow rate of 500 cc/min at 25° C. temperature. The flow rate was controlled using mass flow controller (Bonkhorst mass controller) connected with the tube fitting. Concentration of formaldehyde in the challenge air ($C_O$) and downstream ($C_t$) air from the filter was measured using a gas chromatography in FID mode (Agilent 7820 A). The breakthrough point is considered when the formaldehyde concentration in the downstream becomes 5% of the challenge concentration. Service life of the test sample was recorded in minutes required for the formaldehyde level in the downstream air to reach 50 ppm.

In all cases enhanced gas removal is shown by comparative determinations using raw activated carbon.

Results—Example 1

Figure 3:
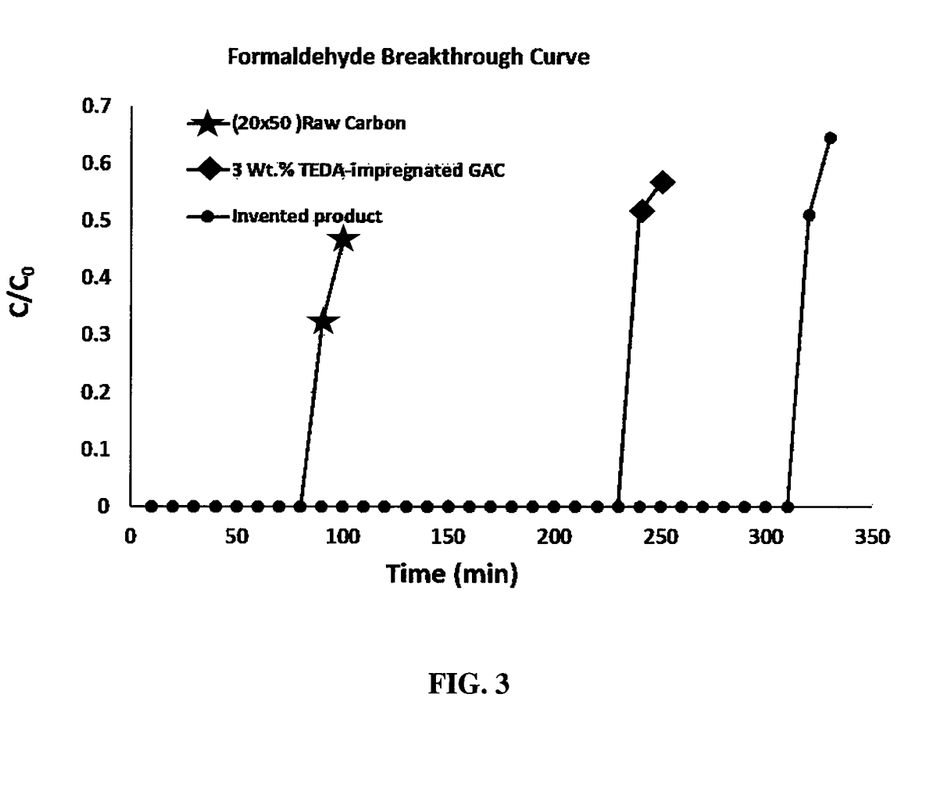
FIG. 3 depicts comparative formaldehyde adsorption breakthrough plots by raw 20×50 GAC, 3 Wt. % TEDA-impregnated 20×50 GAC, and 3 Wt. % TEDA/3 Wt. % Cu impregnated 20×50 GAC.

A. Comparative formaldehyde adsorption performance of raw activated 20×50 GAC, 3 Wt. % TEDA-impregnated 20×50 GAC, and 3 Wt. % TEDA/3 Wt. % Cu impregnated 20×50 GAC were evaluated under identical experimental conditions. For this comparative test, the initial experimental conditions were as follows:
Formaldehyde concentration in the challenge gas stream is 1000 ppmv
Gas flow rate 500 cc/min
Weight of the media 5 g
Carbon particle size 20×50 (coconut-shell based)
Operating temperature 25° C. and pressure 1 atm FIG. 3 depicts comparative formaldehyde adsorption breakthrough plots by raw 20×50 GAC, 3 Wt. % TEDA-impregnated 20×50 GAC, and 3 Wt. % TEDA/3 Wt. % Cu impregnated 20×50 GAC.

The performance of raw carbon and treated carbon is measured and demonstrated in terms of the breakthrough and saturation capacity during the dynamic adsorption experiments. Pure activated carbon is hydrophobic in nature and its adsorption capacity is limited. However, the adsorption capacity as well as catalytic activity of the carbon can be significantly enhanced by modifying its surface with suitable impregnants. There are many factors that influence the performance of activated carbon, e.g., specific surface area, pore volume, pore-size distribution, nature of the activated carbon surface, and the types of functional moieties that are present on the carbon surface. The surface modifications result in the change in the surface reactivity, as well as chemical, physical, and/or structural properties. Raw activated carbon is not suitable for formaldehyde adsorption because of the presence of oxygen functional groups. In this instance, TEDA treatment on carbon changes its surface properties which enable better adsorptivity towards formaldehyde. Moreover, incorporation of Cu creates an amine-Cu adduct, which lowers the volatility of TEDA. Such reduction in volatility is quite useful in many aspects; it improves the thermal stability of the media, and also reduces the rate of aging which makes it suitable to serve for longer period of time.

Table I depicts the breakthrough adsorption capacity, which is reported in mg of formaldehyde adsorbed per cubic centimeter of the adsorbent media.

TABLE I

| | Raw 20 × 50 GAC | 3 Wt. % TEDA-impregnated 20 × 50 GAC | 3 Wt. % TEDA/3 Wt. % Cu impregnated 20 × 50 GAC |
|---|---|---|---|
| Breakthrough time (min) | 90 | 240 | 320 |
| Breakthrough adsorption capacity (mg/cc) | 6.14 | 16.0 | 21.83 |

Figure 4:
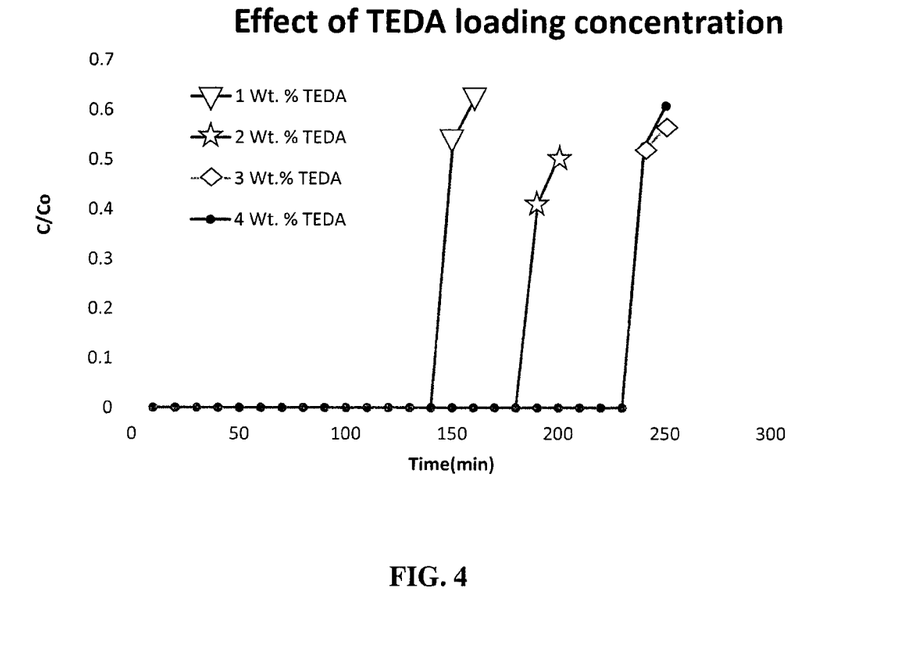
FIG. 4 depicts a comparative formaldehyde adsorption breakthrough plots by 1 Wt. % TEDA-impregnated 20×50 GAC, 2 Wt. % TEDA-impregnated 20×50 GAC, 3 Wt. % TEDA-impregnated 20×50 GAC and 4 Wt. % TEDA-impregnated 20×50 GAC.

Example 2—Effect of TEDA Loading Concentration on the Breakthrough Adsorption Capacity for Formaldehyde Comparative formaldehyde adsorption performance of 1 Wt. % TEDA-impregnated 20×50 GAC, 2 Wt. % TEDA-impregnated 20×50 GAC, 3 Wt. % TEDA-impregnated 20×50 GAC and 4 Wt. % TEDA-impregnated 20×50 GAC were evaluated under identical experimental conditions. For this comparative test, the initial experimental conditions were as follows:
  Formaldehyde concentration in the challenge gas stream is 1000 ppmv
  Gas flow rate 500 cc/min
  Weight of the media 5 g
  Carbon particle size 20×50 (coconut-shell based)
  Operating temperature 25° C. and pressure 1 atm FIG. 4 depicts a comparative formaldehyde adsorption breakthrough plots by 1 Wt. % TEDA-impregnated 20×50 GAC, 2 Wt. % TEDA-impregnated 20×50 GAC, 3 Wt. % TEDA-impregnated 20×50 GAC and 4 Wt. % TEDA-impregnated 20×50 GAC.

Table II depicts the breakthrough adsorption capacity is reported in mg of formaldehyde adsorbed per cubic centimeter of the adsorbent media.

TABLE II

|  | 1 Wt. % TEDA-impregnated 20 × 50 GAC | 2 Wt. % TEDA-impregnated 20 × 50 GAC | 3 Wt. % TEDA-impregnated 20 × 50 GAC | 4 Wt. % TEDA-impregnated 20 × 50 GAC |
| --- | --- | --- | --- | --- |
| Breakthrough time (min) | 150 | 190 | 240 | 240 |
| Breakthrough adsorption capacity (mg/cc) | 10.23 | 12.96 | 16.0 | 16.0 |

Figure 5:
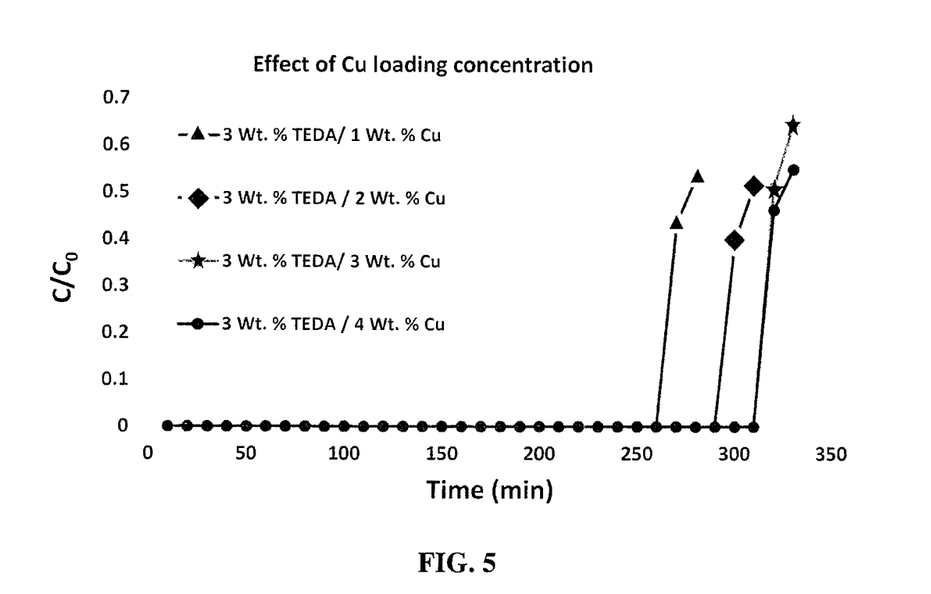
FIG. 5 depicts a comparative formaldehyde adsorption breakthrough plots by 3 Wt. % TEDA/1 Wt. % Cu treated 20×50 GAC, 3 Wt. % TEDA/2 Wt. % Cu treated 20×50 GAC, 3 Wt. % TEDA/3 Wt. % Cu treated 20×50 GAC and 3 Wt. % TEDA/4 Wt. % Cu treated 20×50 GAC.

Example 3—Effect of Cu Loading Concentration on the Breakthrough Adsorption Capacity for Formaldehyde Comparative formaldehyde adsorption performance of 3 Wt. % TEDA/1 Wt. % Cu treated 20×50 GAC, 3 Wt. % TEDA/2 Wt. % Cu treated 20×50 GAC, 3 Wt. % TEDA/3 Wt. % Cu treated 20×50 GAC, and 3 Wt. % TEDA/4 Wt. % Cu treated 20×50 GAC were evaluated under identical conditions. For this comparative test, the initial experimental conditions were as follows:
  Formaldehyde concentration in the challenge gas stream is 1000 ppmv
  Gas flow rate 500 cc/min
  Weight of the media 5 g
  Carbon particle size 20×50 (coconut-shell based)
  Operating temperature 25° C. and pressure 1 atm FIG. 5 depicts a comparative formaldehyde adsorption breakthrough plots by 3 Wt. % TEDA/1 Wt. % Cu treated 20×50 GAC, 3 Wt. % TEDA/2 Wt. % Cu treated 20×50 GAC, 3 Wt. % TEDA/3 Wt. % Cu treated 20×50 GAC and 3 Wt. % TEDA/4 Wt. % Cu treated 20×50 GAC.

Table III depicts the breakthrough adsorption capacity is reported in mg of formaldehyde adsorbed per cubic centimeter of the adsorbent media.

TABLE III

|  | 3 Wt. % TEDA/ 1 Wt. % Cu treated 20 × 50 GAC | 3 Wt. % TEDA/ 2 Wt. % Cu treated 20 × 50 GAC | 3 Wt. % TEDA/ 3 Wt. % Cu treated 20 × 50 GAC | 3 Wt. % TEDA/ 4 Wt. % Cu treated 20 × 50 GAC |
| --- | --- | --- | --- | --- |
| Breakthrough time (min) | 270 | 300 | 320 | 320 |
| Breakthrough adsorption capacity (mg/cc) | 18.42 | 20.47 | 21.83 | 21.83 |

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of preparing activated carbon-based filtration media for adsorption of airborne lower aldehydes, comprising:
  introducing activated carbon having a predetermined mesh size;
  first impregnating said activated carbon with a tertiary nucleophilic amine forming amine-impregnated activated carbon by spraying an aqueous solution of said tertiary nucleophilic amine onto said activated carbon, and drying said amine-impregnated activated carbon; and then subsequently
  depositing copper at an amount of approximately 0.1-10 wt. % onto said amine-impregnated activated carbon forming an amine-Cu composition and amine-Cu adducts onto said amine-impregnated activated carbon.

2. The method of claim 1 wherein said tertiary nucleophilic amine comprises a water soluble tertiary amine.

3. The method of claim 1 wherein said tertiary nucleophilic amine comprises triethylenediamine (TEDA).

4. The method of claim 3 wherein forming amine-impregnated activated carbon comprises forming TEDA-impregnated activated carbon.

5. The method of claim 4 wherein forming said amine-Cu composition comprises forming a TEDA-Cu composition and TEDA-Cu adducts on the surface of the TEDA-impregnated activated carbon.

6. The method of claim 1, wherein said activated carbon includes coconut-based carbon, coal-based carbon, or wood-based, or any combination thereof.

7. The method of claim 6 wherein said activated carbon is in granular form.

8. The method of claim 1, wherein said predetermined mesh size is 4×8, 6×12, 8×16, 12×20, 12×30, 18×40, or 20×50.

9. The method of claim 1, wherein said step of drying said amine-impregnated activated carbon includes:
  performing a first drying step at approximately 80° C. 100° C. for about eight hours; and
  performing a second drying step at approximately 160° C. for about four hours;
  until moisture content of said amine-impregnated activated carbon is approximately less than 2 percent.

10. The method of claim 1, wherein said step of depositing copper on said amine-impregnated activated carbon includes depositing copper by an incipient wetness impregnation method and drying said amine-Cu composition at approximately 100° C. for about twelve hours.

11. The method of claim 1, wherein said copper is added as copper salt of nitrate or chloride or acetate.

12. The method of claim 1 wherein said copper comprises copper sulfate pentahydrate having a purity of about 99% or greater.

13. The method of claim 1, wherein said lower aldehydes include formaldehyde.

14. A method of preparing activated carbon-based filtration media for adsorption of airborne lower aldehydes, comprising:
  first introducing activated carbon having a predetermined mesh size;
  second impregnating said activated carbon with triethylenediamine (TEDA), forming TEDA-impregnated activated carbon; and
  third depositing copper on said TEDA-impregnated activated carbon, forming a TEDA-Cu composition and TEDA-Cu adducts onto the surface of said TEDA-impregnated activated carbon.

15. A method of forming a triethylenediamine/copper (TEDA-Cu) composition for a filtration media for removal of formaldehyde, said method comprising:
  first activated coconut-based carbon, activated coal-based carbon, or activated wood-based carbon, having a predetermined mesh size of about 4×8, 6×12, 8×16, 12×20, 12×30, 18×40, and/or 20×50;
  second impregnating said activated carbon with triethylenediamine (TEDA) by spraying an aqueous solution of TEDA onto said activated carbon, and drying said TEDA impregnated activated carbon in a two-step process including:
  performing a first drying step at approximately 80° C.-100° C. for about eight hours; and
  performing a second drying step at approximately 160° C. for about four hours;
  until moisture content of said TEDA impregnated activated carbon is approximately less than 2 percent, thereby forming TEDA-impregnated activated carbon; and
  third depositing copper on said TEDA-impregnated activated carbon, forming said TEDA-Cu composition and TEDA-Cu adducts onto the surface of said TEDA-impregnated activated carbon.

16. The method of claim 15 wherein said step of depositing copper on said TEDA-impregnated activated carbon includes depositing copper by an incipient wetness impregnation method and drying said TEDA-Cu composition at approximately 100° C. for about twelve hours.

17. An air filter media for removal of formaldehyde consisting of: an activated carbon impregnated with triethylenediamine (TEDA) at an amount up to approximately 4 wt. %, and subsequently deposited with copper at an amount up to approximately 4 wt. %, such that surface level TEDA-Cu adducts are exposed.

18. The air filter media of claim 17, wherein said activated carbon includes coconut-based carbon, coal-based carbon, or wood-based, or any combination thereof.

19. The air filter media of claim 17, wherein said activated carbon has a predetermined mesh size of 4×8, 6×12, 8×16, 12×20, 12×30, 18×40 and/or 20×50.

20. The air filter media of claim 17, wherein said activated carbon is in granular form.

21. The air filter media of claim 17, wherein said copper comprises a copper salt of nitrate or chloride or acetate.

22. The air filter media of claim 17, wherein said copper comprises copper sulfate pentahydrate having a purity of about 99% or greater.

23. The air filter media of claim 17, wherein said TEDA comprises 0.5 to 10 Wt. % and said copper comprises 0.1 to 10 Wt. %.

* * * * *

UNITED STATES PATENT AND TRADEMARK OFFICE
CERTIFICATE OF CORRECTION

PATENT NO. : 10,773,235 B2  
APPLICATION NO. : 16/027943  
DATED : September 15, 2020  
INVENTOR(S) : Nabin Kumar Pal et al.

Page 1 of 1

It is certified that error appears in the above-identified patent and that said Letters Patent is hereby corrected as shown below:

In the Claims

Column 11 Line 26 Claim 15 delete "first activated" and substitute therefor -- "first introducing activated" --

Signed and Sealed this
Eighth Day of December, 2020

Andrei Iancu
*Director of the United States Patent and Trademark Office*